US009014103B2

(12) United States Patent
Moon et al.

(10) Patent No.: US 9,014,103 B2
(45) Date of Patent: Apr. 21, 2015

(54) METHOD AND APPARATUS FOR TRANSMITTING/RECEIVING PREAMBLE OF RANDOM ACCESS CHANNEL IN A BROADBAND WIRELESS COMMUNICATION SYSTEM

(75) Inventors: Hi-Chan Moon, Yongin-si (KR); Seung-Chul Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 1021 days.

(21) Appl. No.: 11/842,833

(22) Filed: Aug. 21, 2007

(65) Prior Publication Data

US 2008/0043671 A1 Feb. 21, 2008

(30) Foreign Application Priority Data

Aug. 21, 2006 (KR) .................. 10-2006-0079047

(51) Int. Cl.
*H04W 4/00* (2009.01)
*H04W 74/00* (2009.01)
*H04W 74/08* (2009.01)

(52) U.S. Cl.
CPC ........ *H04W 74/004* (2013.01); *H04W 74/0833* (2013.01); *H04W 74/0866* (2013.01)

(58) Field of Classification Search
CPC ................. H04W 74/0833; H04W 74/0866; H04L 27/2613; H04L 5/0007; H04L 5/0053
USPC ......... 370/328, 329, 330, 335, 336, 342, 345; 375/343; 415/450, 512
See application file for complete search history.

(56) References Cited

U.S. PATENT DOCUMENTS

| 6,381,229 | B1 * | 4/2002 | Narvinger et al. | 370/328 |
| 6,574,212 | B1 | 6/2003 | Halton et al. | |
| 6,625,138 | B2 | 9/2003 | Karna et al. | |
| 6,643,275 | B1 | 11/2003 | Gustafsson et al. | |
| 6,859,445 | B1 * | 2/2005 | Moon et al. | 370/335 |
| 6,944,454 | B1 | 9/2005 | Lee et al. | |
| 7,957,263 | B2 | 6/2011 | Gaal | |
| 2001/0026543 | A1 * | 10/2001 | Hwang et al. | 370/335 |
| 2002/0137548 | A1 * | 9/2002 | Miya | 455/562 |
| 2003/0058972 | A1 * | 3/2003 | Iochi | 375/343 |
| 2003/0069044 | A1 | 4/2003 | Yotsumoto | |
| 2004/0014452 | A1 * | 1/2004 | Lim et al. | 455/403 |
| 2004/0264497 | A1 * | 12/2004 | Wang et al. | 370/465 |

(Continued)

FOREIGN PATENT DOCUMENTS

| KR | 1020000047455 | 7/2000 |
| KR | 1020050029395 | 3/2005 |
| KR | 1020050087449 | 8/2005 |
| KR | 1020060085619 | 7/2006 |

(Continued)

OTHER PUBLICATIONS

Popovic et al. "Random Access Preambles for Evolved UTRA Cellular System", IEEE 2006, pp. 488-492.*

(Continued)

*Primary Examiner* — Jung Park
(74) *Attorney, Agent, or Firm* — The Farrell Law Firm, P.C.

(57) ABSTRACT

A method for transmitting a preamble over a Random Access CHannel (RACH) in a wireless communication system is provided. The method includes generating a preamble having a length longer than a basic transmission unit, and dividing the preamble into preambles having a length less than the basic transmission unit; and sequentially transmitting the divided preambles over the RACH using different antennas.

13 Claims, 15 Drawing Sheets

(56) References Cited

U.S. PATENT DOCUMENTS

2005/0143118 A1* 6/2005 Bernhardsson et al. ...... 455/522
2005/0232158 A1* 10/2005 Hondo .......................... 370/241
2007/0010210 A1* 1/2007 Singh et al. ..................... 455/73
2007/0270108 A1* 11/2007 Kim et al. ....................... 455/91
2007/0291696 A1* 12/2007 Zhang et al. ................. 370/331

FOREIGN PATENT DOCUMENTS

WO   WO 2004/023674   3/2004

OTHER PUBLICATIONS

Ericsson, "E-UTRA Scalability of Random Access Preamble", TSG-RAN WG1 #45, R1-061367, May 2, 2006.

* cited by examiner

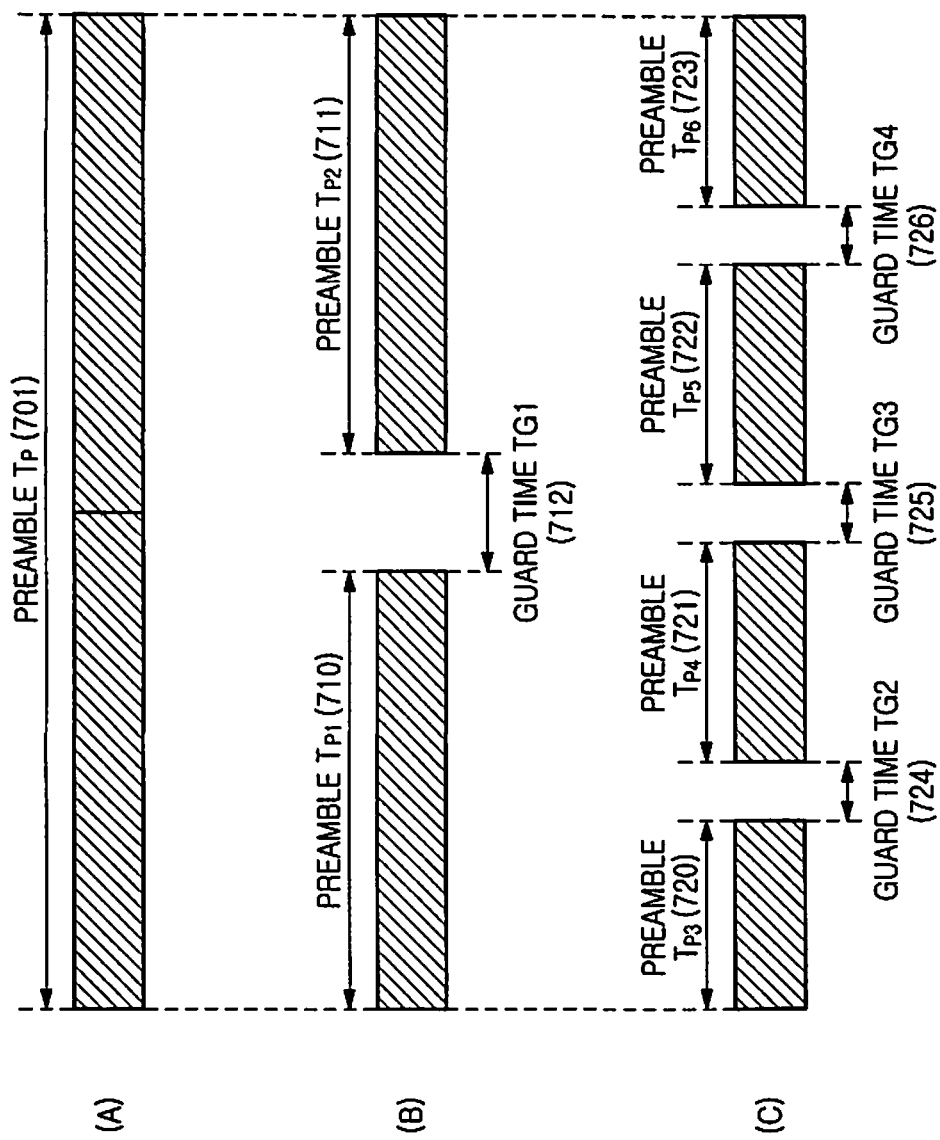

METHOD AND APPARATUS FOR
TRANSMITTING/RECEIVING PREAMBLE
OF RANDOM ACCESS CHANNEL IN A
BROADBAND WIRELESS COMMUNICATION
SYSTEM

PRIORITY

This application claims priority under 35 U.S.C. §119(a) to a Korean Patent Application filed in the Korean Intellectual Property Office on Aug. 21, 2006 and assigned Serial No. 2006-79047, the disclosure of which is incorporated herein by reference.

BACKGROUND OF THE INVENTION

1. Field of the Invention

The present invention relates generally to a method and apparatus for transmitting preambles in a wireless communication system, and in particular, to a method and apparatus for transmitting/receiving preambles of a reverse access channel (or random access channel) in a broadband wireless communication system.

2. Description of the Related Art

With the rapid progress of communication technology, mobile communication systems have reached the stage of providing high-speed data services in which not only normal voice call services but also multimedia services are available. A packet data system supporting the high-speed data services can be roughly classified into a synchronous system mainly adopted, for example, in the United States, and an asynchronous system mainly adopted, for example, in Europe and Japan, and different standardization studies are being conducted by standard groups according to a use/nonuse of the synchronous system and the asynchronous system.

The synchronous packet data system proposed by Third Generation Partnership Project 2 (3GPP2), one of the standards groups, is evolving into Code Division Multiple Access (CDMA) 2000 1x currently in service, 1x EVolution Data Only (EV-DO) in which high-speed packet transmission is available, and EVolution of Data and Voice (EV-DV) capable of supporting both voice and packet services. In addition, the asynchronous packet data system proposed by Third Generation Partnership Project (3GPP), is also called Universal Mobile Telecommunication Systems (UMTS), and the Wideband Code Division Multiple Access (W-CDMA) system can be a typical example of the asynchronous packet data system.

Of the channels used in the W-CDMA system, a reverse common channel uses a Random Access CHannel (RACH), as is well known, and a description of the RACH will be made below.

FIG. 1 is a diagram illustrating a communication signal transmission/reception relationship of a reverse common channel in the conventional W-CDMA system.

In FIG. 1, reference numeral 151 indicates a reverse channel, and the reverse channel can be the RACH. Reference numeral 101 indicates a forward channel, and the forward channel can be an Access Preamble Acquisition Indication CHannel (AICH), also known as AP-AICH. In the case of FIG. 1, a mobile terminal has succeeded in preamble transmission by transmitting an Access Preamble (AP) to a base station over an RACH twice.

Referring to FIG. 1, after transmitting a preamble AP0 152 with a predetermined length over the RACH, a mobile terminal waits for a response from a base station over an AICH. If there is no response from the base station for a predetermined time 'tp-p' 156, the mobile terminal retransmits a preamble AP1 154, whose transmission power has increased by ΔP 155, to the base station. Upon detecting a preamble transmitted over the RACH, the base station transmits a signature 102 of the detected preamble to the mobile terminal over an AICH of a forward link in response to the preamble. The mobile terminal determines whether there is a signature signal received over an AICH in response to the transmitted preamble. Upon receipt of a signature signal over the AICH, the mobile terminal demodulates the received signature signal. If the signature responsive to the preamble over the AICH is detected as an ACKnowledgement signal (ACK), the mobile terminal sends a message over the RACH, determining that the base station has detected the preamble.

However, even though the mobile terminal has received the AICH signal 102 transmitted by the base station within a time 'tp-ai' 103 set in FIG. 1 after transmitting the preamble 152, if the mobile terminal fails to detect its transmitted signature from the AICH signal 102, the mobile terminal retransmits the preamble after the predetermined time 'tp-p' 156, determining that the base station has failed to receive the preamble. In this case, the mobile terminal, as described above, increases power of the preamble transmitted in the previous state by about ΔP(dB), retransmits the preamble with the increased power as shown by reference numeral 154, receives an AICH signal transmitted by the base station within a predetermined time, and detects a signal that uses its transmitted signature.

Upon failure to receive an AICH signal using its transmitted signature from the base station after transmitting the preamble, the mobile terminal delays the set time and then repeatedly performs the above operation while increasing transmission power of the preamble. Upon receipt of the signal using its transmitted signature in the process of transmitting a preamble and receiving an AICH signal as stated above, the mobile terminal delays a set time 'tp-msg' 158, and then transmits a message 157 of a reverse common channel with the power corresponding to the preamble.

FIG. 2 is a diagram briefly illustrating a reverse access probe. In FIG. 2, reference numeral 201 indicates a preamble, which is the reverse access probe. A mobile terminal transmits a randomly selected signature as a preamble, and control information other than this is not transmitted. All messages can be transmitted after the mobile terminal receives, over an AICH, an ACK signal indicating that a base station has detected the preamble (or signature), i.e. reverse access probe, transmitted by the mobile terminal.

FIG. 3 is a diagram illustrating a signal transmission/reception relationship of a reverse/forward common channel proposed in 3GPP Long-Term Evolution (LTE), and FIG. 4 is a diagram illustrating exemplary reverse RACH allocation, which is taken into consideration in 3GPP LTE. The LTE system recently proposed in 3GPP, which is the standard group for the asynchronous mobile communication system, uses, as a transmission scheme, Orthogonal Frequency Division Multiplexing (OFDM) in a forward link and Single Carrier-Frequency Division Multiple Access (SC-FDMA) in a reverse link.

In the exemplary reverse RACH allocation of FIG. 4, the horizontal axis represents the time domain and the vertical axis represents the frequency domain. In FIG. 4, one SC-FDMA slot is the one reverse RACH slot 401. It is shown in FIG. 4 that in the defined RACH slot 401, an RACH burst 402 is allocated in a predetermined frequency domain before being transmitted. Even for the RACH of the LTE system, like that of the W-CDMA system, if a base station detects a preamble after a mobile terminal transmits the preamble, the base station sends a response to the preamble to the mobile terminal so that the mobile terminal can transmit a data message. Upon receipt of the response transmitted by the base station, the mobile terminal can perform a series of processes for transmitting the data message. However, in the LTE system, because a transmission scheme of its physical channel is not a CDMA scheme, there is a need for design of an appropriate transmission scheme.

Returning to the description of FIG. 3, in the RACH transmission scheme currently discussed in the LTE system, after transmitting a preamble 352 with a predetermined length over a reverse RACH 351, the mobile terminal waits for a response from the base station. If there is no response from the base station for a predetermined time 'tp-p' 356, the mobile terminal retransmits a preamble 353, transmission power of which has increased by ΔP(dB) 354, to the base station. Thereafter, upon detecting a preamble over the RACH, the base station transmits, as a response message to the preamble, a forward AICH 301 such as reference numeral 302 of FIG. 3 within a predetermined time 'tp-ai' 303. Upon receipt of the response message, the mobile terminal can transmit its desired transmission data using a message shown by reference numeral 353 after a predetermined time 'tp-msg' 357. The response message that the base station sends in response to the preamble is called an access grant message.

In FIG. 3, the mobile terminal determines whether the access grant message responsive to the preamble is received from the base station. Receipt/non-receipt of the access grant message can be determined using a signature corresponding to the preamble of the mobile terminal and/or IDentifier (ID) information of the corresponding mobile terminal. Upon detecting the access grant message, the mobile terminal sends a reverse message in, for example, an SC-FDMA scheme, determining that the base station has detected its transmitted preamble. The mobile terminal can adjust a transmission time of the message transmitted in an SC-FDMA scheme, depending on time correction information from control information received over the access grant message.

However, if the mobile terminal fails to detect a signal using a signature responsive to the preamble as the mobile terminal fails to receive the access grant message from the base station within a predetermined time 'tp-ai' after transmitting the preamble 352, the mobile terminal retransmits the preamble after a predetermined time, determining that the base station has failed to detect the preamble. In this case, the mobile terminal increases power of the preamble transmitted in the previous state by ΔP(dB) 354, and retransmits the preamble with the increased power. Thereafter, if the base station transmits an access grant message as the base station normally receives the preamble, the mobile terminal receives the access grant message transmitted by the base station within a predetermined time, and detects from the received access grant message a signal that uses a signature responsive to the preamble and/or mobile terminal's ID information.

After transmitting the preamble, if the mobile terminal fails to receive an access grant message using its transmitted signature from the base station, the mobile terminal delays a predetermined time and then repeatedly performs the above operation while increasing the transmission power of the preamble. If the mobile terminal receives a signal using its transmitted signature in the process of receiving an access grant message from the base station after transmitting the preamble, mobile terminal delays a predetermined time 'tp-msg' 357 as shown in FIG. 3 and then transmits a message on a reverse RACH with the power corresponding to the preamble.

In the LTE system, the access grant message that the base station receiving the preamble transmits to the mobile terminal can use a coded message transmitted over a particular frequency/time interval of the OFDM system. In addition, the access grant message can include therein time correction information of RACH, ID of RACH, channel allocation information for the reverse channel over which the mobile terminal transmits data, and the like.

A structure of the RACH preamble now under discussion in the LTE system is shown in FIG. 5. A basic unit of reverse transmission is a sub-frame 501 and has a 0.5-ms length. A preamble 510 is transmitted in one sub-frame 501, and time margins are provided before and after the preamble taking into account the initial timing synchronization of an uplink, round-trip delay time, and maximum delay spread time of the channel, i.e., the preamble 510, to prevent interference to/from the previous symbol, is transmitted for a $T_P$ time 530 after a lapse of the maximum delay spread time $T_{ds}$ 520 of the channel beginning from a start point of the sub-frame.

In addition, to prevent uncertainty of the timing synchronization of the uplink and prevent interference to/from the next symbol, the transmission of the preamble terminates in advance of an end point of the sub-frame 501 by a sum of the round-trip delay time $T_{GP}$ and the maximum delay spread time $T_{ds}$ of the channel as shown by reference numeral 540. The round-trip delay time $T_{GP}$ is a delay time required when the mobile station receives a signal transmitted by the base station and the base station receives a signal that the mobile terminal has transmitted after acquiring synchronization, and the round-trip delay time $T_{GP}$ is about 6.7 μsec/km.

However, there is a limitation in extending the maximum supportable cell radius with the preamble structure of FIG. 5. This is because even though the maximum transmission power of the mobile terminal is limited, the maximum cell radius supportable by the preamble is limited to the maximum transmission energy used for the preamble. In addition, though the maximum transmission energy of the preamble is proportional to the length of the preamble, the round-trip delay time 540 increases with the cell radius, causing a decrease in the length of the preamble i.e., because there is a trade-off relationship between the cell radius and the preamble length, there is a limitation in extending the maximum cell radius with the preamble structure of FIG. 5.

As described above, because the round-trip delay time is about 6.7 μsec/km, an increase in the cell radius by 1 km causes a decrease in the preamble length by 6.7 μsec, thereby reducing the preamble energy. The reduction in the preamble energy may reduce the preamble detection capability at the base station. Therefore, because there is a limitation in extending the cell radius with the preamble structure of FIG. 5, there is a demand for a preamble transmission scheme capable of preventing a reduction in the preamble detection performance while increasing the cell radius.

SUMMARY OF THE INVENTION

An aspect of the present invention is to address at least the above problems and/or disadvantages and to provide at least the advantages described below. Accordingly, an aspect of the present invention is to provide a method and apparatus for transmitting/receiving a preamble of a reverse access channel in a broadband wireless communication system.

Another aspect of the present invention is to provide a preamble transmission/reception method and apparatus for increasing the maximum cell coverage of a reverse access channel in a broadband wireless communication system.

Another aspect of the present invention is to provide a preamble transmission/reception method and apparatus capable of flexibly allocating a length of a preamble according to a size of a cell radius in a broadband wireless communication system.

Another aspect of the present invention is to provide a preamble transmission/reception method and apparatus capable of simply detecting a preamble transmitted by a mobile terminal, and reducing an access time delay of the mobile terminal due to a reverse access channel in a base station of a broadband wireless communication system.

Another aspect of the present invention is to provide a preamble transmission/reception method and apparatus capable of simplifying a structure of a mobile terminal and allowing a base station to simply detect a preamble when the mobile terminal has more than two transmission antennas and uses transmit diversity during preamble transmission in a broadband wireless communication system.

According to one aspect of the present invention, there is provided a method for transmitting a preamble over a Random Access CHannel (RACH) in a wireless communication system using Single Carrier-Frequency Division Multiple Access (SC-FDMA). The method includes generating a preamble having a length greater than a length of a basic transmission unit, and dividing the preamble into preambles having a length less than the length of a basic transmission unit; and sequentially transmitting the divided preambles over the RACH using different antennas.

According to another aspect of the present invention, there is provided a method for receiving a preamble over a Random Access CHannel (RACH) in a wireless communication system using Single Carrier-Frequency Division Multiple Access (SC-FDMA). The method includes receiving a sample of the RACH received for at least two basic transmission units, and storing the received sample in a memory; comparing a size of a correlation value determined by performing synchronous and asynchronous accumulation on the stored samples, with a predetermined threshold; and if the correlation value is greater than the threshold, determining that the preamble is received.

According to further another aspect of the present invention, there is provided an apparatus for transmitting a preamble over a Random Access CHannel (RACH) in a wireless communication system using Single Carrier-Frequency Division Multiple Access (SC-FDMA). The apparatus includes a signature generator for generating a preamble longer than a basic transmission unit, setting, as a guard time, a time longer than a round-trip delay time of a sub-frame, and generating a signature of the preamble; and a modulator for amplifying the signature of the preamble, performing Radio Frequency (RF) modulation thereon, and outputting a radio signal.

According to yet another aspect of the present invention, there is provided an apparatus for receiving a preamble over a Random Access CHannel (RACH) in a wireless communication system using Single Carrier-Frequency Division Multiple Access (SC-FDMA). The apparatus includes a memory for receiving a sample of the RACH received for at least two basic transmission units, and storing the received sample for a slot interval; a searcher for generating a correlation value determined by performing synchronous and asynchronous accumulation on the stored samples; a decider for comparing a size of the correlation value with a predetermined threshold, and if the correlation value is greater than the threshold, determining that the preamble is received; and a controller for controlling a length of the synchronous and asynchronous accumulation.

According to still another aspect of the present invention, there is provided a method for determining a preamble of a Random Access CHannel (RACH) and providing the preamble to a mobile terminal in a wireless communication system using Single Carrier-Frequency Division Multiple Access (SC-FDMA). The method includes determining a length of a preamble such that the preamble has a length longer than a basic transmission unit, and determining a guard time taking into account a signal coverage of a base station; and providing information on the length and guard time of the preamble to the mobile terminal.

BRIEF DESCRIPTION OF THE DRAWINGS

The above and other aspects, features and advantages of the present invention will become more apparent from the following detailed description when taken in conjunction with the accompanying drawings in which:

FIG. 7 is a diagram illustrating a structure of a preamble for a reverse access channel according to another embodiment of the present invention;

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

A brief description will first be made of a wireless communication system to which the present invention is applied, and the basic concept of the present invention. The present invention provides a preamble transmission scheme for a reverse access channel, which can be applied, for example, to the LTE system that uses, as a transmission scheme, OFDM in the forward link and SC-FDMA in the reverse link. Although the LTE system is used herein as an example, the LTE system is not intended to limit the scope of the present invention. The preamble structure and its transmission scheme according to the present invention can be applied not only to the LTE system but also to various broadband wireless communication systems that transmit a preamble over a reverse access channel.

The basic concept of the present invention will now be described. The present invention provides a method for extending a length of a preamble to that of one sub-frame or more in a broadband wireless communication system, and a method for applying transmit diversity during use of this method. When a mobile terminal has more than two transmission antennas, the mobile terminal switches the transmission antennas so as to transmit one independent preamble via each of the transmission antennas during preamble transmission, thereby obtaining a transmit diversity effect. As a result, a base station can simply detect the preamble transmitted by the mobile terminal. Therefore, the mobile terminal can reduce an access time delay caused by a reverse access channel, and use of the transmit diversity allows an inter-antenna switching time, thereby simplifying implementation of the mobile terminal and facilitating simple preamble detection at the base station.

In an embodiment of the present invention, when a length of the preamble is extended to a length of one or more sub-frames during preamble transmission, a guard time can optionally exist between preambles. The guard time may exist in the same access probe of the mobile terminal, or exist between independent access probes. In addition, the present invention can be applied regardless of a type of an access grant message that the base station transmits to the mobile terminal upon receipt of a preamble.

Figure 1:
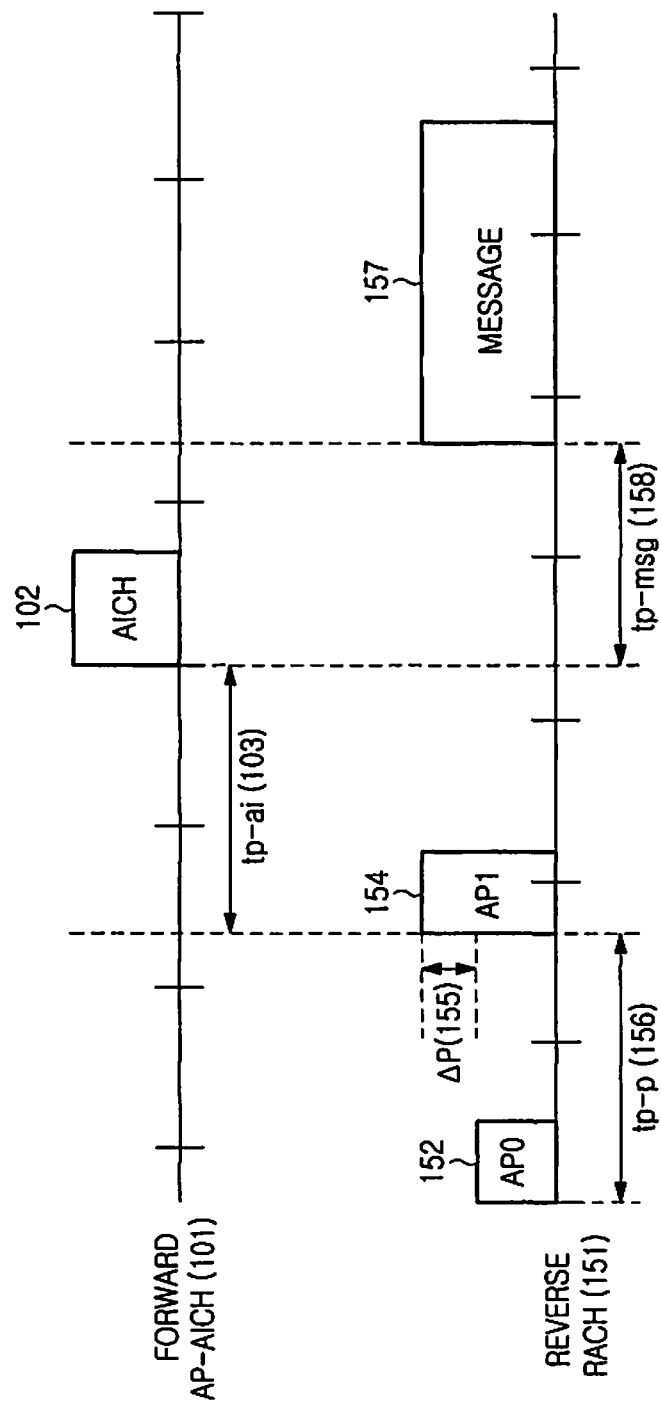
FIG. 1 is a diagram illustrating a communication signal transmission/reception relationship of a reverse common channel in the conventional W-CDMA system.
Figure 2:
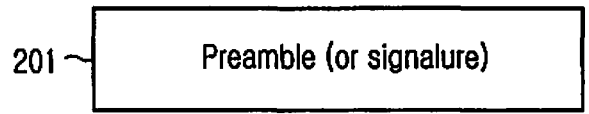
FIG. 2 is a diagram briefly illustrating a reverse access probe.
Figure 3:
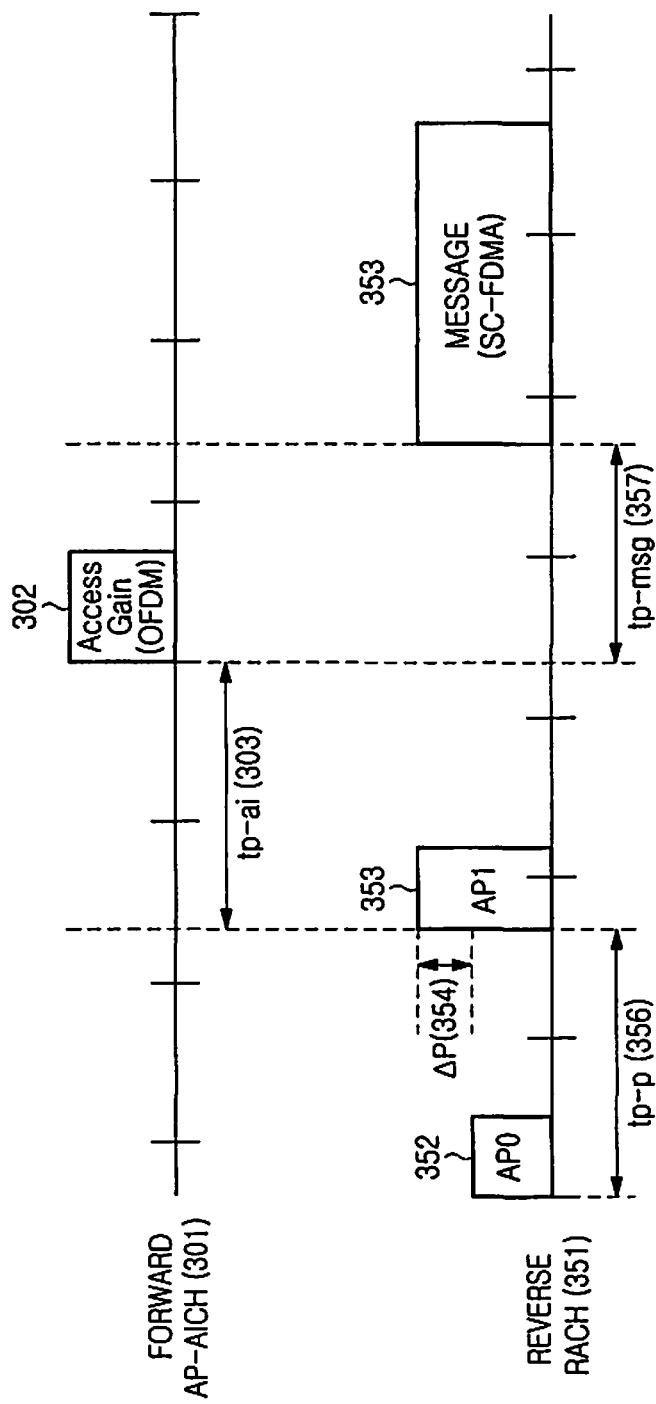
FIG. 3 is a diagram illustrating a signal transmission/reception relationship of a reverse/forward common channel proposed in 3GPP LTE.
Figure 4:
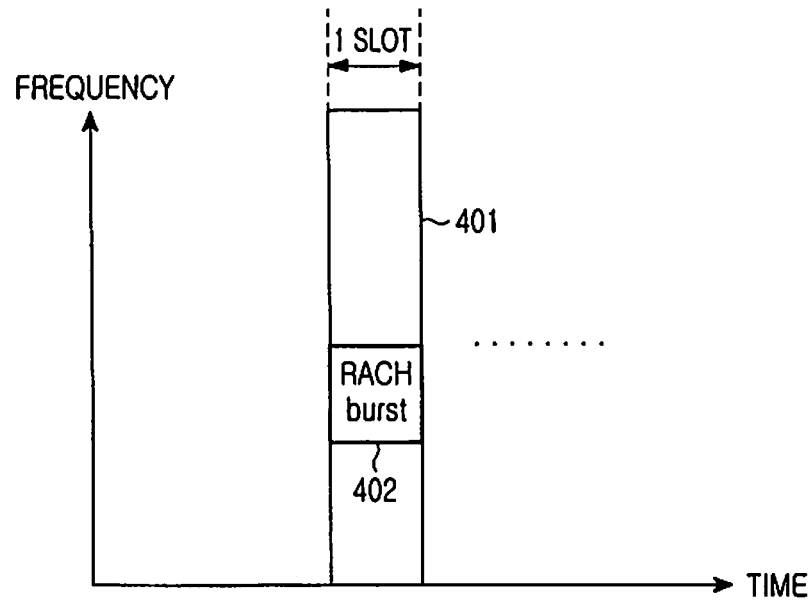
FIG. 4 is a diagram illustrating exemplary reverse RACH allocation proposed in 3GPP LTE.
Figure 5:
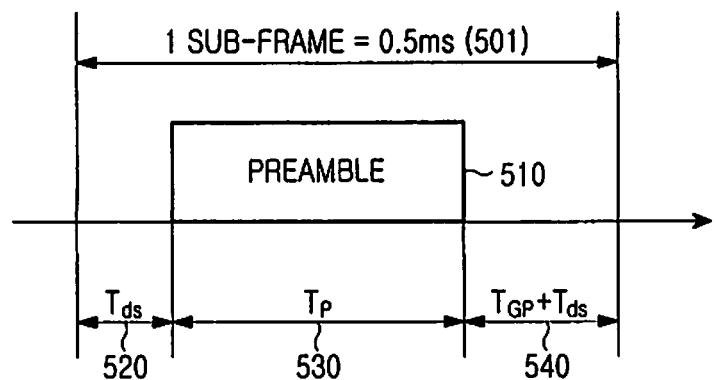
FIG. 5 is a diagram illustrating a structure of a RACH preamble proposed in 3GPP LTE.
Figure 6:
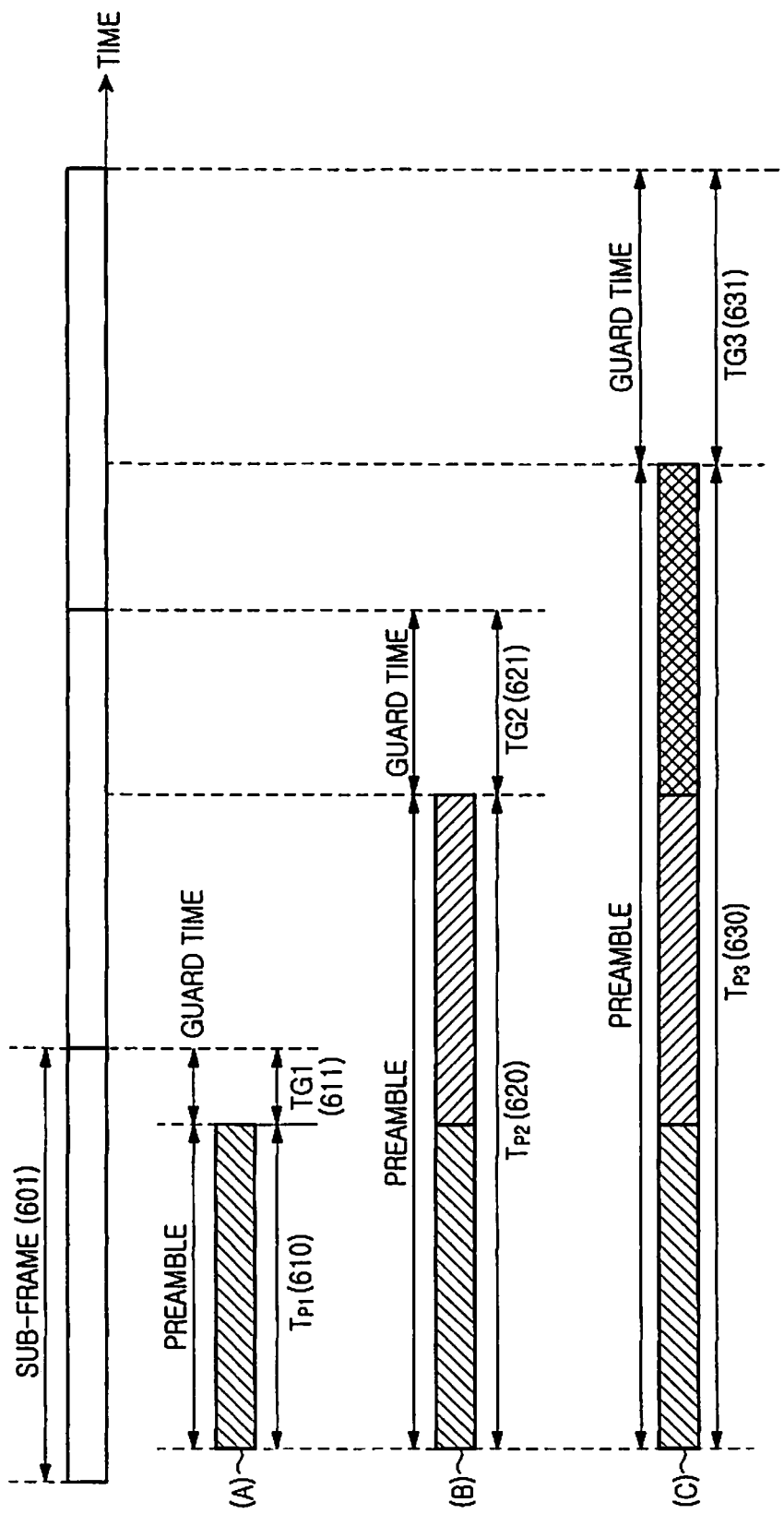
FIG. 6 is a diagram illustrating a structure of a preamble for a reverse access channel according to an embodiment of the present invention.

With reference to FIGS. 6 and 7, a description will be made of a preamble structure for a reverse access channel of the present invention. In addition, with reference to FIGS. 8A to 8C and 9A to 9C, a description will be made of a structure of a transmitter for transmitting a preamble according to an embodiment of the present invention. In the following description, the terms 'reverse access channel', 'reverse random access channel' and 'reverse RACH' will be assumed to be equivalent to each other.

FIG. 6 is a diagram illustrating a structure of a preamble for a reverse access channel according to an embodiment of the present invention.

In FIG. 6, a sub-frame 601 indicates a minimum unit of reverse RACH allocation. Shown in (A) of FIG. 6 is for the conventional case where a preamble of a reverse RACH probe is less than one sub-frame, and shown in (B) and (C) of FIG. 6 are preamble structures to support a cell being greater than a cell radius that can be covered with the preamble structure of (A) of FIG. 6, according to an embodiment of the present invention. In (B) of FIG. 6, a length '$T_{P2}$' 620 of the preamble is longer than a preamble length '$T_{P1}$' 610 in (A) of FIG. 6 so that the preamble can be sufficiently detected even at a base station having a great cell radius, and a guard time 'TG2' 621 is longer than a guard time 'TG1' 611 in (A) of FIG. 6 so that the preamble can cover a round-trip delay time of a greater cell. The preamble sequence in B) of FIG. 6 can be composed of sequences obtained by repeating the preamble sequence in (A) of FIG. 6, or can be composed of new preamble sequences, a preamble length of which is '$T_{P2}$' 620.

Length and guard time information of the preamble sequence are system parameters delivered to all mobile terminals over, for example, a forward broadcast channel, and can be determined depending on a cell coverage desired by the base station. Shown in (C) of FIG. 6 is a preamble structure for a cell being greater than a cell radius that can be supported in (B) of FIG. 6, and a preamble length '$T_{P3}$' 630 is longer than '$T_{P2}$' 620 so that the preamble can be sufficiently detected even at a base station having a great cell radius, and a guard time 'TG3' 631 is longer than 'TG2' 621 to cover a round-trip delay time of a greater cell. The preamble sequence in (C) of FIG. 6 can be a modified preamble sequence obtained by repeating the preamble sequence in (A) of FIG. 6, or can be a new preamble sequence, a length of which is '$T_{P3}$' 630.

System parameters including information on the length and guard time of the preamble can be delivered to all mobile terminals over, for example, a forward broadcast channel, and the parameter values can be determined depending on a cell coverage desired by the base station. The preamble sequence of the present invention can be further extended in the foregoing manner, not only for the embodiments shown in (B) and (C) of FIG. 6, but also for a greater cell coverage.

FIG. 7 is a diagram illustrating a structure of a preamble for a reverse access channel according to another embodiment of the present invention.

A preamble 701 in (A) of FIG. 7 is a preamble of one independent reverse access probe, and corresponds to the preamble described in (B) or (C) of FIG. 6. Shown in (B) of FIG. 7 is a scheme of dividing the independent preamble sequence in (A) of FIG. 7 into two preambles during preamble transmission, and a guard time 'TG1' 712, for which no preamble is transmitted, exists between a preamble 710 and a preamble 711. The preamble 710 and preamble 711 each can be a part of the preamble sequence 701, or can be a new preamble sequence. In (B) of FIG. 7, preamble lengths $T_{p1}$ and $T_{p2}$ can be equal to each other, or different from each other.

When a mobile terminal supports more than two transmission antennas, the preamble 710 and the preamble 711 can be transmitted via different antennas. In this case, it is possible to obtain a transmit diversity gain for one independent preamble, thereby improving detection performance of a reverse RACH preamble at a base station. Shown in (C) of FIG. 7 is an embodiment of dividing the preamble 701 in (A) of FIG. 7 into 4 small preambles 720 to 723 during preamble transmission, and guard times 724 to 726, for which no preamble is transmitted, exist between the preambles. In (C) of FIG. 7, the preambles 720 to 723 each can be a part of the preamble sequence 701 in (A) of FIG. 7, or can be a new preamble sequence. In (C) of FIG. 7, length $T_{p3}$, $T_{p4}$, $T_{p5}$ and $T_{p6}$ of the preambles 720 to 723 can be equal to each other, or different from each other. Similarly, guard times TG2, TG3 and TG4 can also be equal to each other, or different from each other.

Further, in the case where the mobile terminal supports multiple transmission antennas, in (C) of FIG. 7, the preambles 720 to 723 can be transmitted via different transmission antennas. In this case, it is possible to obtain a transmit diversity gain for one independent preamble, thereby improving detection performance of a reverse RACH preamble at the base station. Shown in (B) and (C) of FIG. 7 are embodiments of dividing the independent preamble into preambles having a shorter length, and the number of divided preambles can be further extended to an integer greater than 2 or 4. A signature sequence that the mobile terminal will transmit with a reverse RACH preamble is randomly selected from a set defined for every base station and then transmitted, and the present invention can use a different selectable signature set according to a transmission format of the preamble described in (A) to (C) of FIG. 7.

Figure 12:
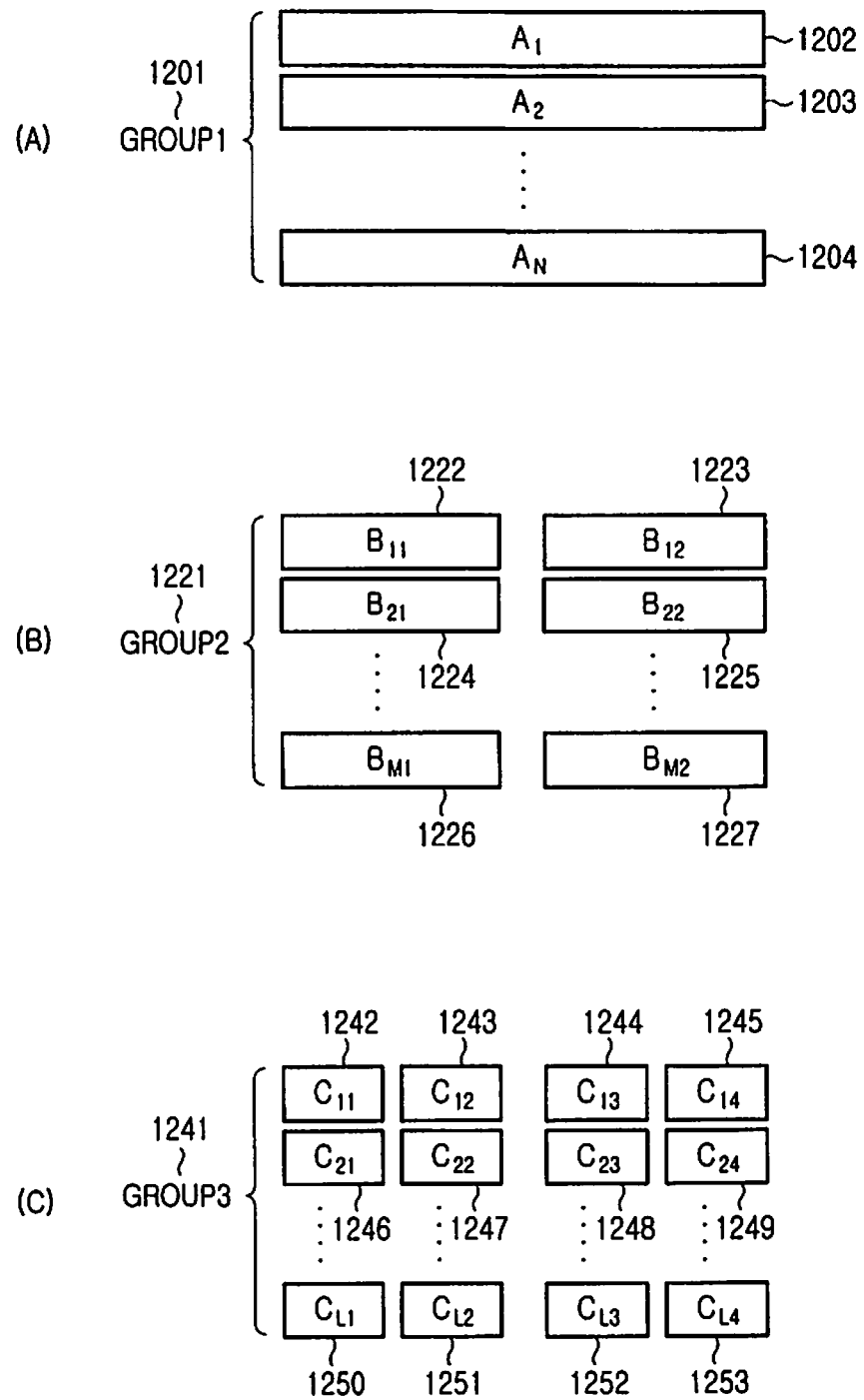
FIG. 12 is a diagram illustrating exemplary signature sequence grouping according to an embodiment of the present invention.

With reference to FIG. 12, a description will be made of exemplary grouping of the signature sequences. (A) to (C) of FIG. 12 correspond to a group #1 1201, a group #2 1221 and a group #3 1241, respectively, and also show exemplary groupings of signature sets selectable according to the preamble type that the mobile terminal will use, as shown in (A), (B) and (C) of FIG. 7, respectively i.e., the group #1 1201 shown in (A) of FIG. 12 indicates a signature sequence group used for transmitting a preamble of the type shown in (A) of FIG. 7, and the group #2 1221 shown in (B) of FIG. 12 indicates a signature sequence group used for transmitting a preamble of the type shown in (B) of FIG. 7. In addition, the group #3 1241 shown in (C) of FIG. 12 indicates a signature sequence group used for transmitting a preamble of the type shown in (C) of FIG. 7.

In FIG. 12, the group #1 1201 includes N sequences whose signature sequences are $A_1$ 1202 to $A_N$ 1204. The group #2 1221 includes 2M sequences whose signature sequences are $B_{11}$ 1222, $B_{12}$ 1223, $B_{21}$ 1224, $B_{22}$ 1225, ..., $B_{M1}$ 1226 and $B_{M2}$ 1227. The sequences in the group #2 1221 can be a part of the sequences in the group #1 1201, or can be new sequences different from the sequences in the group #1 1201. The group #3 1241 includes 4L sequences whose signature sequences are $C_{11}$ 1242, $C_{12}$ 1243, $C_{13}$ 1244, $C_{14}$ 1245, ..., $C_{L3}$ 1252 and $C_{L4}$ 1253. The sequences in the group #3 1241 can be a part of the sequences in any one of the group #1 1201 and the group #2 1221, or can be new sequences different from the sequences in any one of the group #1 1201 and the group #2 1221.

Figure 8A:
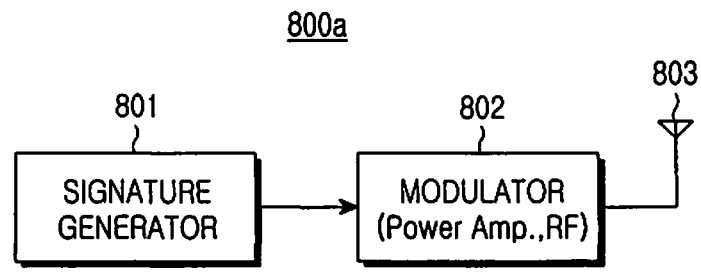
FIGS. 8A to 8C are block diagrams illustrating structures of a mobile terminal's transmitters for transmitting a preamble of a reverse access channel according to an embodiment of the present invention.
Figure 8B:
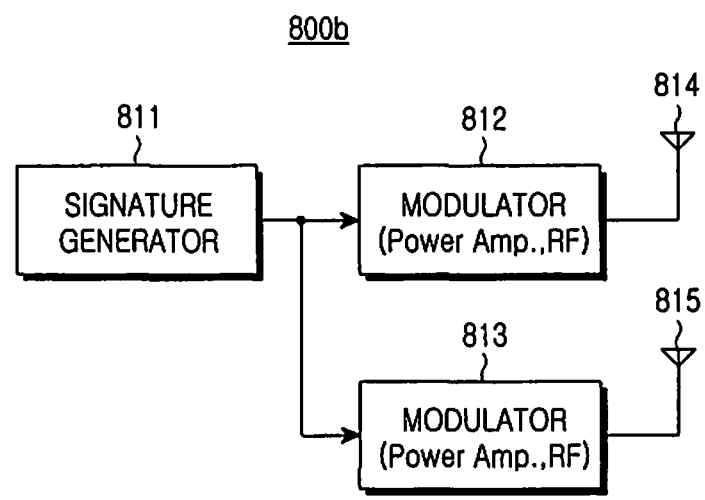
Figure 8C:
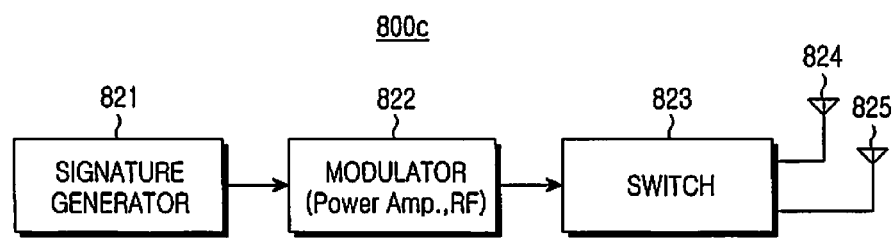

With reference to FIGS. 8A to 8C, a description will be made of a transmitter for transmitting the preamble having the foregoing structure according to an embodiment of the present invention.

FIGS. 8A to 8C are block diagrams illustrating structures of mobile terminal's transmitters for transmitting a preamble of a reverse access channel according to an embodiment of the present invention. The transmitters of FIGS. 8A to 8C are embodiments implemented to transmit the reverse RACH preambles corresponding to (A) to (C) of FIG. 7, respectively.

Shown in FIG. 8A is an embodiment of a transmitter 800a whose mobile terminal includes one transmission antenna 803. Complex In-phase/Quadrature (I/Q) sequences can be used as a signature generated in a signature generator 801 of FIG. 8A. The signature of a reverse RACH preamble, generated in the signature generator 801, is power-amplified, carried on a carrier, and transmitted over a wireless channel via the antenna 803 by means of a modulator 802 including a power amplifier and a Radio Frequency (RF) unit. Shown in FIG. 8B is an embodiment of a transmitter 800b having, for example two mobile terminal's transmission antennas 814 and 815, and having two modulators 812 and 813 each including a power amplifier and an RF unit. Complex I/Q sequences can be used as a signature generated in the signature generator 811 of FIG. 8B. The signature of a reverse RACH preamble, generated in the signature generator 811, is power-amplified, carried on a carrier, and transmitted over a wireless channel via the antennas 814 and 815, respectively, by means of the two modulators 812 and 813.

Shown in FIG. 8C is an embodiment of a transmitter 800c having, for example, two mobile terminal's transmission antennas 824 and 825, and having one modulator 822 including a power amplifier and an RF unit. Complex I/Q sequences can be used as a signature generated in the signature generator 821 of FIG. 8C. The signature of a reverse RACH preamble, generated in the signature generator 821, is power-amplified and carried on a carrier by means of the one modulator 821. A switch 823 switches a transmission path so that the signature of the reverse RACH preamble is transmitted via one of the two antennas 824 and 825. A switching operation of the switch 823 herein can be controlled by an undepicted controller. Although not shown in FIG. 8A to FIG. 8C, the transmitter can include a separate controller for controlling operations of the signature generator and the modulator so as to transmit the signature of the preamble over a reverse RACH.

It should be noted that the signatures generated in the signature generators 801, 811 and 821 of FIG. 8A to FIG. 8C are not limited to a particular signature. Although shown in FIG. 8A to FIG. 8C are embodiments having one or two transmitter's antennas, as an example, the reverse RACH preamble proposed in the present invention can be extended even for a transmitter having more than three transmission antennas.

In the present invention, the transmitter shown in FIG. 8C needs an antenna switching time when the transmitter performs antenna switching to another antenna 825 while performing transmission via the antenna 824 during preamble transmission. About several µsec are required for this switching time, for which the desired transmission preamble sequence may not be correctly transmitted, i.e., the antenna switching time can affect the reverse RACH preamble detection capability at the base station.

In the present invention, because the interim guard times 712, 724, 725 and 726 are provided during reverse RACH preamble transmission as shown in (B) and (C) of FIG. 7, the transmitter can transmit again the preamble after antenna switching is completely performed after a short transmission interrupt of the preamble. Therefore, in the present invention, the reverse RACH preamble can be correctly transmitted without distortion without being affected by the antenna switching time of the transmitter, thereby contributing to improvement of detection capability at the base station.

Figure 9A:
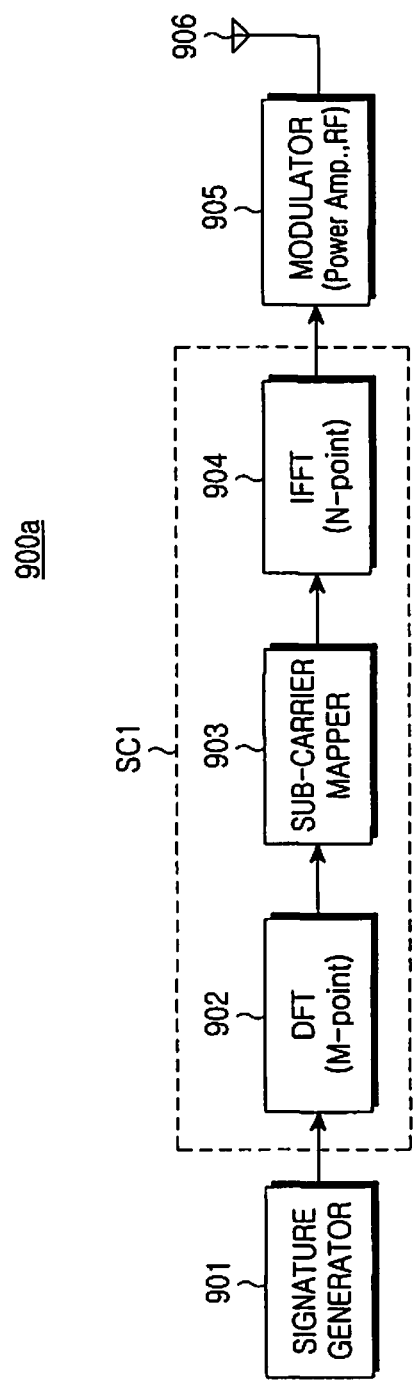
FIG. 9A to FIG. 9C are block diagrams illustrating structures of a terminal's transmitters for transmitting a preamble of a reverse access channel according to another embodiment of the present invention.
Figure 9B:
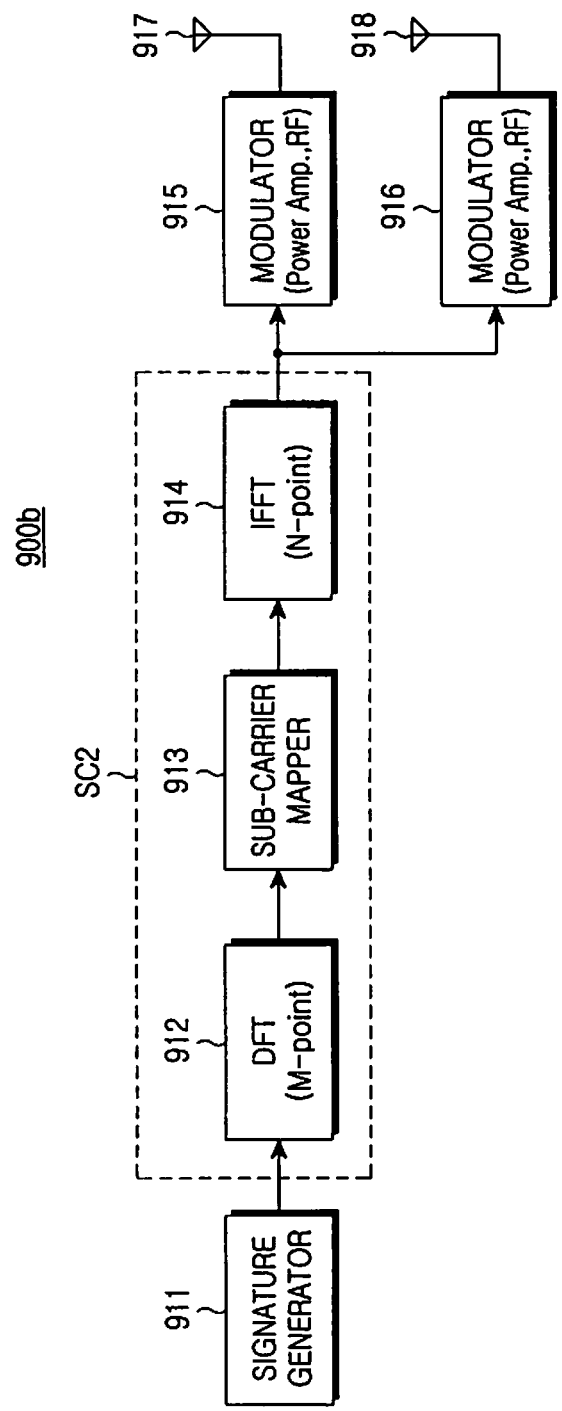
Figure 9C:
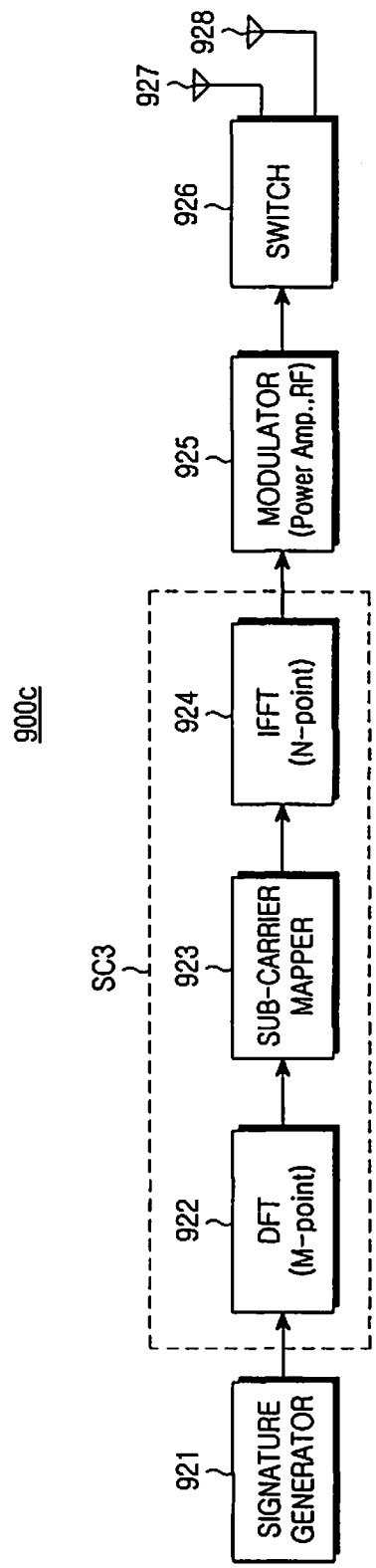

With reference to FIG. 9A to FIG. 9C, a description will now be made of another embodiment of a transmitter for transmitting a preamble having the foregoing structure according to the present invention.

FIG. 9A to FIG. 9C are block diagrams illustrating structures of transmitters for transmitting a preamble of a reverse access channel according to another embodiment of the present invention. The transmitters of FIG. 9A to FIG. 9C are embodiments implemented to transmit the reverse RACH preambles corresponding to (A) to (C) of FIG. 7, respectively.

Shown in FIG. 9A is an embodiment of a transmitter 900a whose mobile terminal includes one transmission antenna 906. Complex I/Q sequences can be used as a signature generated in a signature generator 901 of FIG. 9A. The transmitter of FIG. 9A includes an SC-FDMA signal generator SC1 for generating an SC-FDMA signal. The SC-FDMA signal generator SC1 includes a size-M Discrete Fourier Transform (DFT) processor 902, a sub-carrier mapper 903 for mapping an input signal in a predetermined method, and a size-N Inverse Fast Fourier Transform (IFFT) processor 904.

The DFT processor 902 calculates M frequency component values by performing a DFT operation on M input samples. The sub-carrier mapper 903 maps M input signals to sub-carriers according to a predetermined method, and allocates zero (0) values to unmapped sub-carriers. The sub-carrier mapping method can include a distributed mapping method for uniformly distributing input signals to sub-carries on the entire frequency band, a localized mapping method for localizing input signals to sub-carriers of a particular frequency band, and a combined method of the above two methods. For convenience, this embodiment of the present invention is assumed to use the localized mapping method. The IFFT processor 904 converts N input samples of a frequency-domain signal into a time-domain signal by performing an IFFT operation. The SC-FDMA signal converted into the time-domain signal is power-amplified, carried on a carrier, and transmitted over a wireless channel via the antenna 906 by means of a modulator 905.

Shown in FIG. 9B is an embodiment of a transmitter 900*b* having two mobile terminal transmission antennas 917 and 918, and having two modulators 915 and 916 each including a power amplifier and an RF unit. Complex I/Q sequences can be used as a signature generated in a signature generator 911 of FIG. 9B. The transmitter 900*b* of FIG. 9B, like the embodiment of FIG. 9A, also includes an SC-FDMA signal generator SC2 for generating an SC-FDMA signal. The SC-FDMA signal generator SC2 includes a DFT processor 912, a sub-carrier mapper 913, and an IFFT processor 914, and elements thereof are the same in operation as the corresponding elements of FIG. 9A, so a detailed description thereof will be omitted. The SC-FDMA signal generated by the SC-FDMA signal generator SC2 is power-amplified, carried on a carrier, and transmitted over a wireless channel via the corresponding antennas 917 and 918 by means of the two modulators 915 and 916.

Shown in FIG. 9C is an embodiment of a transmitter 900*c* having two mobile terminal transmission antenna 927 and 928, and having one modulator 925 including a power amplifier and an RF unit. Complex I/Q sequences can be used as a signature generated in a signature generator 921 of FIG. 9C. The transmitter 900*c* of FIG. 9C, like the embodiment of FIG. 9A, also includes an SC-FDMA signal generator SC3 for generating an SC-FDMA signal. The SC-FDMA signal generator SC3 includes a DFT processor 922, a sub-carrier mapper 923, and an IFFT processor 924, and elements thereof are the same in operation as the corresponding elements of FIG. 9A, so a detailed description thereof will be omitted. The SC-FDMA signal generated by the SC-FDMA signal generator SC3 is power-amplified, carried on a carrier, and transmitted over a wireless channel by means of the one modulator 925. A switch 926 switches a transmission path so that the signature of the reverse RACH preamble is transmitted via any one of the two antennas 927 and 928. A switching operation of the switch 926 herein can be controlled by an undepicted controller. In the present invention, the characteristic of defining interim guard times during reverse RACH preamble transmission and transmitting again the preamble after antenna switching is completely performed after a short transmission interrupt of the preamble can be applied even to the transmitter of FIG. 9C. Although not shown in FIG. 9A to FIG. 9C, the transmitters each can include a separate controller for controlling operations of the signature generator and the modulator so as to transmit the preamble signature over a reverse RACH.

It should be noted that the signatures generated in the signature generators 901, 911 and 921 of FIG. 9A to FIG. 9C are not limited to a particular signature. Although shown in FIG. 9A to FIG. 9C are embodiments having one or two transmitter's antennas, as an example, the reverse RACH preamble proposed in the present invention can be extended even for a transmitter having more than three transmission antennas.

With reference to FIGS. 9A to 9C and FIG. 10, a description will be made of a receiver for receiving a preamble according to an embodiment of the present invention.

Figure 10:
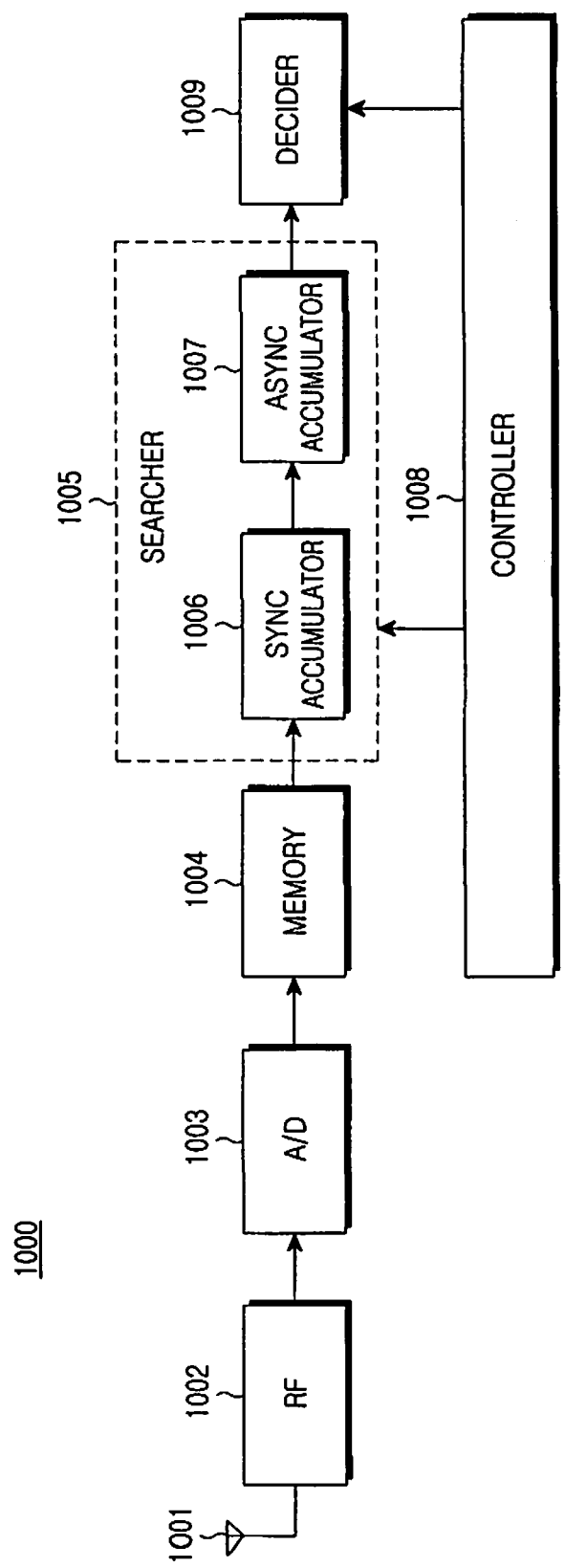
FIG. 10 is a block diagram illustrating a structure of a receiver of a base station for receiving a preamble of a reverse access channel according to an embodiment of the present invention.

FIG. 10 is a block diagram illustrating a structure of a receiver of a base station for receiving a preamble of a reverse access channel according to an embodiment of the present invention. The receiver of FIG. 10 receives an access probe signal transmitted by a mobile terminal, and is receives an access probe signal transmitted from the transmitters of FIGS. 8A to 8C or FIGS. 9A to 9C.

A structure of the receiver 1000 of FIG. 10 will be described below. Upon receipt of a radio signal via a reception antenna 1001, an RF processor 1002 converts a signal received on a carrier into a baseband signal. An Analog-to-Digital (A/D) converter 1003 samples a baseband analog signal, converts the baseband analog signal into a digital signal, and outputs the resulting signal to a memory 1004. The memory 1004 stores baseband samples output from the A/D converter 1003 for a time of a slot length of a reverse RACH or longer. A searcher 1005 of FIG. 10 searches for start points of preambles or signatures available in all mobile terminals, from the samples stored in the memory 1004, and delivers the search result to a decider 1009.

In the receiver of FIG. 10, the searcher 1005 is assumed to be a correlator-based searcher. It is assumed that for a correlation value exceeding a particular threshold, the correlator-based searcher delivers search results, such as a search position and searched preamble or signature, to the decider 1009. In the embodiment of the present invention, the searcher 1005 includes a synchronous accumulator 1006 and an asynchronous accumulator 1007. The synchronous accumulator 1006 repeats a process of multiplying the sample values stored in the memory 1004 by a signature sequence to be detected, and then accumulating the result. The asynchronous accumulator 1007 repeats an operation of squaring the result value synchronous-accumulated for a predetermined interval and accumulating energy thereof. The accumulated energy value is herein output as a correlation value, which is the search result. The decider 1009 determines from the search result whether a preamble or signature is searched. If the search result of the searcher 1005 is less than a threshold for a correlation value, the decider 1009 determines that there is no preamble received. However, if the correlation value of the search result is greater than the threshold, the decider 1009 determines that a preamble or signature is received. A controller 1008 controls operations of the searcher 1005 and the decider 1009. In addition, the controller 1008 controls a synchronous accumulation length, an asynchronous accumulation length and a guard time length of the searcher 1005. Further, the controller 1008 can control a detection probability by adjusting a threshold of the decider 1009.

Figure 13:
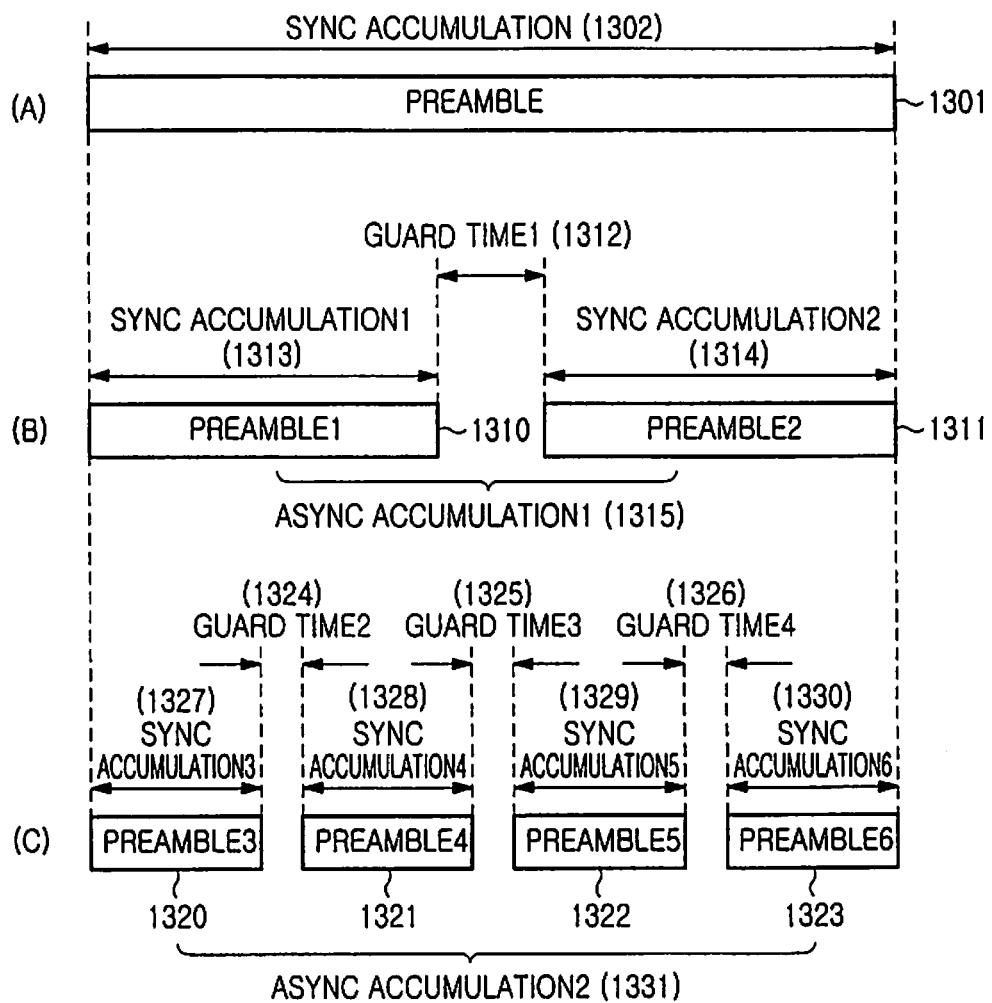
FIG. 13 is a diagram illustrating exemplary synchronous and asynchronous accumulation operations performed in a searcher of a receiver according to an embodiment of the present invention.

With reference to FIG. 13, a description will now be made of an operation performed in the searcher 1005 of the receiver of FIG. 10.

FIG. 13 is a diagram illustrating exemplary synchronous and asynchronous accumulation operations performed in a searcher of a receiver according to an embodiment of the present invention.

Referring to (A) of FIG. 13, because one preamble 1301 is continuously transmitted, the synchronous accumulator 1006 in the receiver of FIG. 10 performs synchronous accumulation for a synchronous accumulation interval 1302, and the asynchronous accumulator 1007 performs one asynchronous accumulation. Referring to (B) of FIG. 13, one preamble is divided into two preambles of a preamble #1 1310 and a preamble #2 1311 during preamble transmission, and a guard time #1 1312, for which no preamble is transmitted, exists between them. When a preamble of this type is transmitted, the synchronous accumulator 1006 performs synchronous accumulation on the preamble #1 1310 for a synchronous accumulation interval #1 1313, and delivers the result value to the asynchronous accumulator 1007. Then the asynchronous accumulator 1007 squares the received synchronous-accumulated result value, converts the squared value into an energy value and accumulates the resulting value. Again, the synchronous accumulator 1006 performs synchronous accumulation on the preamble #2 1311 for a synchronous accumulation interval #2 1314, and delivers the result value to the asynchronous accumulator 1007. Then the asynchronous accumulator 1007 squares the received synchronous-accumulated result value, converts the squared value into an energy value and accumulates the resulting value.

Referring to (C) of FIG. 13, one preamble is divided into 4 preambles of a preamble #3 1320, a preamble #4 1321, a preamble #5 1322 and a preamble #6 1323 during preamble transmission, and a guard time #2 1324, a guard time #3 1325 and a guard time #4 1326, for which no preamble is transmitted, exist between the preambles. When a preamble of this type is transmitted, the synchronous accumulator 1006 in the receiver of FIG. 10 performs synchronous accumulation on the preamble #3 1320 for a synchronous accumulation interval #3 1327, and delivers the result value to the asynchronous accumulator 1007. Then the asynchronous accumulator 1007 squares the asynchronous-accumulated value, converts the squared value into an energy value, and accumulates the resulting value. In the same manner, the synchronous accumulator 1006 performs synchronous accumulation on the preambles #4 1321, #5 1322 and #6 1323 for synchronous accumulation intervals #4 1328, #5 1329 and #6 1330, respectively, and delivers the result values to the asynchronous accumulator 1007. Then the asynchronous accumulator 1007 squares each asynchronous-accumulated value, converts the squared value into an energy value, and accumulates the resulting value. The foregoing operation can be extended in a manner of reducing the synchronous accumulation interval and increasing the number of asynchronous accumulations when there is a great frequency error between the mobile terminal and the base station.

Figure 11:
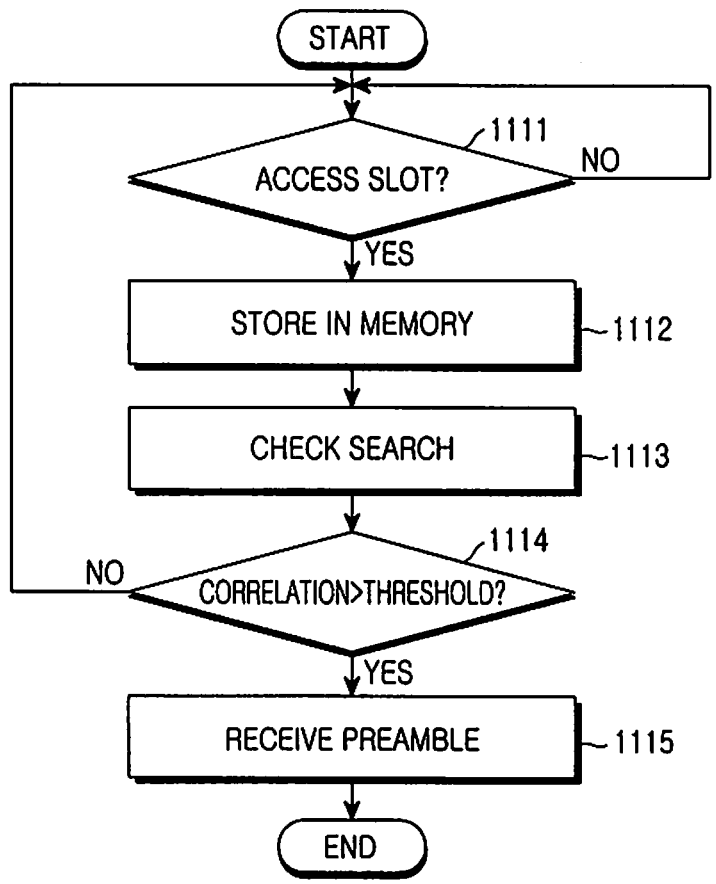
FIG. 11 is a flowchart illustrating an operation of a receiver according to the present invention.

FIG. 11 is a flowchart illustrating an operation of a receiver according to embodiment of the present invention.

Referring to FIG. 11, a receiver of a base station determines in step 1111 whether a slot (or access slot) of a reverse RACH starts. If the access slot does not start, the receiver continuously waits for the access slot in step 1111. If it is determined in step 1111 that an access slot starts, the receiver starts in step 1112 to store an output of an A/D converter 1003 in a memory 1004. A length of the samples stored in the memory 1004 can be equal to or grater than a length of the access slot. When the storing of the sample in the memory 1004 is completed in step 1112, a searcher 1005 performs a search on all possible preambles or signatures in step 1113. In this embodiment of the present invention, the searcher 1005 is assumed to be a correlator-based searcher. When the search operation of the searcher 1005 is completed in step 1113, a decider 1009 compares in step 1114 a correlation value obtained from the searcher 1005 with a threshold. If there is no correlation value exceeding the threshold among the correlation values, the decider 1009 returns to step 1111 and waits for the next access slot. However, if there is a correlation value exceeding the threshold in step 1114, the decider 1009 determines in step 1115 that the corresponding preamble or signature is received.

As is apparent from the foregoing description, the present invention can extend the maximum cell coverage of a reverse access channel and increase a longer preamble or signature of the reverse access channel according to cell coverage in the broadband wireless communication system.

In addition, when there are more than two transmission antennas, the present invention can obtain a transmit diversity gain within one independent preamble, thereby improving a preamble detection capability at a base station. Further, the present invention defines a guard time(s), for which no preamble is transmitted, during one preamble transmission interval, and allows a mobile terminal using an antenna switching technique to transmit a preamble without signal distortion, thereby improving a detection capability at the base station.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a preamble over a Random Access CHannel (RACH) in a wireless communication system, the method comprising:
   generating one preamble having a length greater than a length of a sub-frame, and dividing the one preamble into preambles, each of the preambles having a length less than the length of the sub-frame;
   setting different guard times, during which no preamble is transmitted, between the divided preambles; and
   sequentially transmitting the divided preambles over the RACH using different antennas,
   wherein each guard time is longer than a round-trip delay time of the sub-frame.

2. The method of claim 1, wherein each guard time is determined depending on a system parameter received from a base station.

3. The method of claim 1, wherein the length of the one preamble is determined depending on a system parameter received from a base station.

4. The method of claim 3, wherein the length of the one preamble is set in proportion to a cell size of the base station.

5. The method of claim 1, wherein the divided preambles are equal in length to each other.

6. The method of claim 1, wherein the divided preambles are different in length from each other.

7. The method of claim 1, wherein the one preamble further comprises an IDentifier (ID) of a mobile terminal.

8. A method for receiving a preamble over a Random Access CHannel (RACH) in a wireless communication system, the method comprising:
   receiving samples of preambles divided and transmitted for basic transmission units of the RACH, and storing the received samples in a memory;
   comparing a size of a correlation value determined by performing synchronous and asynchronous accumulation on the stored samples, with a predetermined threshold; and
   if the correlation value is greater than the threshold, determining that the preamble is received,
   wherein the comparing comprises:
   independently performing synchronous accumulation on the samples of the preambles for the individual basic transmission units; and
   independently squaring the synchronous-accumulated result values, converting the squared values into energy values, and accumulating the energy values.

9. An apparatus for transmitting a preamble over a Random Access CHannel (RACH) in a wireless communication system, the apparatus comprising:
   a signature generator for generating one preamble longer than a sub-frame, setting, as a guard time, a time longer than a round-trip delay time of the sub-frame, and generating a signature of the one preamble, wherein the signature generator divides a sequence of the one preamble into at least two preambles, and sets different guard times, during which no preamble is transmitted, between the at least two divided preambles; and a modulator for amplifying the signature of the one preamble, performing an Radio Frequency (RF) modulation thereon, and outputting a radio signal.

10. The apparatus of claim 9, wherein multiple modulators are provided to perform an RF modulation on the divided preambles, and the divided preambles are transmitted via multiple antennas.

11. The apparatus of claim 9, further comprising:

at least two antennas for transmitting the divided preambles; and a switch for switching the divided preambles to one of the antennas.

12. An apparatus for receiving a preamble over a Random Access CHannel (RACH) in a wireless communication system, the apparatus comprising:

a memory for receiving samples of preambles divided and transmitted for basic transmission units of the RACH, and storing the received samples for a slot interval;

a searcher for generating a correlation value determined by performing synchronous and asynchronous accumulation on the stored samples;

a decider for comparing a size of the correlation value with a predetermined threshold, and if the correlation value is greater than the threshold, determining that the preamble is received; and a controller for controlling a length of the synchronous and asynchronous accumulation, wherein the decider independently performs synchronous accumulation on the samples of the preambles for the individual basic transmission units, independently squares the synchronous-accumulated result values, converts the squared values into energy values, and accumulates the energy values.

13. A method for determining a preamble of a Random Access CHannel (RACH) and providing the preamble to a mobile terminal in a wireless communication system, the method comprising:

determining a length of the preamble such that the preamble has a length longer than a basic transmission unit, and determining a guard time taking into account a signal coverage of a base station;

providing information on the length and guard time of the preamble to the mobile terminal; and determining a size in which the preamble is to be divided for a transmission of the divided preambles via at least two antennas, determining a guard time between the divided preambles, and providing the preamble to the mobile terminal.

* * * * *